United States Patent
Swiezkowski et al.

(10) Patent No.: US 6,648,955 B1
(45) Date of Patent: Nov. 18, 2003

(54) CORRUGATING ADHESIVE

(75) Inventors: Frank J. Swiezkowski, Hamilton Square, NJ (US); Robert L. Billmers, Stockton, NJ (US); Patrick B. Mwonya, Jamesburg, NJ (US); Gordon W. Seaman, West Milford, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/696,799

(22) Filed: Oct. 25, 2000

(51) Int. Cl.$^7$ ................................ C09J 103/02
(52) U.S. Cl. ................. 106/211.1; 106/210.1; 106/213.1; 106/214.1; 106/214.2; 524/47
(58) Field of Search ............... 106/211.1, 210.1, 106/213.1, 214.1, 214.2; 156/78, 210, 336; 428/182; 524/47

(56) References Cited

U.S. PATENT DOCUMENTS

| | | |
|---|---|---|
| 2,051,025 A | 8/1936 | Bauer |
| 4,561,918 A | 12/1985 | Scharfenberg et al. |
| 5,286,769 A | 2/1994 | Eden et al. |
| 5,756,556 A | 5/1998 | Tsai et al. |
| 6,238,504 B1 | 5/2001 | Simmons, Jr. et al. |
| 6,280,514 B1 | 8/2001 | Lydzinski et al. |

FOREIGN PATENT DOCUMENTS

| | | |
|---|---|---|
| EP | 0 376 301 | 8/1994 |

OTHER PUBLICATIONS

CAPLUS 1984:157564, Hummerich et al, "Ketone–Formaldehyde–urea resins", Feb. 1984.*

CAPLUS 0998:217467, Philbin et al, "Ketone–Formaldehyde crosslinking additives for . . . ", Apr. 1998.*

* cited by examiner

*Primary Examiner*—David Brunsman
(74) *Attorney, Agent, or Firm*—Cynthia L. Foulke

(57) ABSTRACT

Corrugating adhesives comprising a starch, an alkali, water and a surfactant allow the user to control the amount of adhesive applied, minimize warpage of the final corrugated board and allows equipment to run faster and in a more efficient manner.

10 Claims, No Drawings

CORRUGATING ADHESIVE

FIELD OF THE INVENTION

The invention relates to an adhesive. In particular, the invention relates to a corrugating adhesive and to corrugated products constructed with the adhesive.

BACKGROUND OF THE INVENTION

Corrugated board conventionally is prepared by a process known as the Stein-Hall process. As is generally described in U.S. Pat. No. 2,102,937, the Stein-Hall process employs a corrugating adhesive to bond a corrugated paper "medium" such as a roll or strip, to a liner board on one or both sides of the corrugated medium.

Adhesives used in conjunction with the Stein-Hall process are traditionally alkaline adhesives comprised of ungelatinized raw starch suspended in an aqueous dispersion of cooked starch (carrier). The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the fully formulated adhesive. In the corrugating process, the adhesive is applied (usually at between 25° C. and 55° C.) to the tips of the fluted paper medium or single-faced board, whereupon the application of heat causes the raw starch to gelatinize, resulting in an instantaneous increase in viscosity and tack and formation of the adhesive bond.

Known corrugating adhesives suffer from a number of drawbacks. For example, the speed of the machinery used to prepare the corrugated board sometimes is limited by the rheological properties of the adhesive. During manufacture of corrugated board, the corrugating adhesive typically is spread across the liner board or the corrugated paper medium with a spreader knife or metering roller. It has been observed that conventional adhesives undergo substantial shear thinning when they are spread too quickly, thus leading to problems in applying the adhesive to a corrugating medium in conventional corrugating equipment. The shear thinning thus may serve to limit the speed of the corrugating equipment, and thus may limit the attainable output of corrugated board.

Another drawback relates to the green bonding strength of conventional corrugating adhesives and, more specifically, to the rate at which the tack of the adhesive increases when the corrugated board is in the green state. Typically, corrugated board is processed and handled before the adhesive has fully dried, the adhesive thus being in the green state. If the adhesive has not become tacky quickly enough, then the corrugated board will delaminate during the processing operations that follow the bonding operation. The rate of increase of tackiness of known adhesives thus may be a further limiting factor in the rate of manufacture of corrugated board.

There continues to be a need in the industry for a corrugating adhesive that will allow the user to control the amount of adhesive applied, minimize the warpage of the final corrugated board and that will allow equipment to run faster and in a more efficient manner.

SUMMARY OF THE INVENTION

The invention provides a composition for producing a stable, consistent aqueous starch-based corrugating adhesive.

One aspect of the invention is directed to an adhesive composition comprising an aqueous solution of a starch, an alkali, and a surfactant. In one embodiment, the adhesive is a foamed adhesive.

Another aspect of the invention is directed to method of producing a corrugating adhesive comprising dispersing a carrier starch in aqueous alkali and borax, uniformly mixing in a raw starch, and adding a surfactant. The surfactant is preferably used at a level of from about 0.05 to about 10 percent actives by weight, based on the total adhesive weight. In the preparation of a foamed adhesive, the process further comprising applying energy to create the foam.

Yet another aspect of the invention is directed to corrugated paperboard constructed with the adhesives of the invention and articles comprising corrugated paperboard.

DETAILED DESCRIPTION OF THE INVENTION

The disclosures of all references cited herein are incorporated in their entireties by reference.

The invention provides corrugating adhesives and, in particular foamed corrugating adhesives.

Foamed adhesives show improved economics and performance over adhesives which are not foamed. Since foamed adhesives do not penetrate porous surfaces to the same extent as non-foamed adhesives, the open time increases and the tendency for pre-cure decreases. In addition, at any given film thickness, a foamed adhesive contains less water than an unfoamed adhesive. Less water in the adhesive leads to little or no warping of the paper substrate. Foamed adhesives also have the ability to hold out on a substrate surface to a greater extent than unfoamed adhesives, resulting in less applied adhesive affording faster machine speeds, faster cure rate and lower adhesive costs.

While methods have been proposed for foaming polymer adhesives, success has been demonstrated only with synthetic polymers. While many surfactants can produce foam, a significant and detrimental impact on the viscosity and flow properties of full formulation corrugating adhesives has been observed. Foamed starched-based adhesives tend to be unstable and dissipate within a few minutes. Starch-based (Stein-Hall) adhesives have the additional requirements of high pH and a heterogeneous system containing both dispersed and granular starch. These latter two requirements have made the task of providing a stable yet effect foamed corrugating adhesive very illusive.

It has now been discovered that surfactants that do not contain, either within the backbone or within a side chain thereof, propylene oxide or ethylene oxide moieties can solubilize ionic groups and are excellent foaming agents for corrugating adhesives. The adhesive of the invention has good foam stability, excellent adhesive properties and good flow characteristics.

The terms "adhesive" and "foamable adhesive," as used to describe the adhesives of the invention, are used interchangeable herein. While the foamable adhesive is useful in the unfoamed state as a corrugating adhesive, the adhesive may also be foamed, e.g., by the application of energy, to provide a stable and effective foamed corrugating adhesive. Thus, both unfoamed and foamed corrugating adhesives are encompassed by the invention.

The term "corrugated paperboard" as used herein refers to a fluted medium and a facing glued to the tips on one or both sides of the fluted medium. The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed there between. The above-described procedure produces what is known to those skilled in the art as a single-faced board in that the facing is applied to only one surface thereof. If a double-faced paperboard in which an inner fluted layer sandwiched between two facings is desired, a second operation is performed wherein the adhesive is applied to the exposed tips of the single-faced board and the adhesive-coated tips are then pressed against a second facing in the combining section of the corrugator under the influence of pressure and heat. The typical corrugating process and the operation and use of corrugators in general are described, e.g., in U.S. Pat. Nos. 2,051,025 and 2,102,937.

The foamable adhesive composition of the invention comprises a liquid carrier containing a starch, an alkali, and a surfactant. Each of these ingredients is required to provide the unique blend of adhesive and foam properties. The composition may also, optionally, contain a boron-containing compound.

The liquid carrier is preferably water, but may further also include any other components as may be known in the art or found to be suitable. The foamable composition will generally contain from about 10 to about 97 percent by weight of water. Preferably the composition contains from about 50 to about 80 percent by weight of water.

A number of starches may be used to prepare the corrugating adhesive of the invention. Starches such as rye, corn, potato, wheat, sorghum, and tapioca starches are all useful. The starch portion of the adhesive formulation preferable comprises both a granular (raw starch) and dispersed starch (carrier starch).

The base starch material (raw starch) can be derived from any plant source including, but not limited to, corn, potato, wheat, rice, sago, tapioca, waxy maize, sorghum and high amylose starch, i.e., starch having at least 45% and more particularly 65% amylose content, such as high amylose corn. Preferred is starch derived from wheat and/or corn. By "base" starch is meant raw or native starch, i.e., starch as it comes from the plant source. Such base starch include natural starches as well genetically altered and hybrid starches.

The dispersed starch may be native as above or degraded to reduce the viscosity of the solution or modified, i.e., crosslinked. Starches for use in accordance with the invention may be degraded by any means known in the art. Means of obtaining a degraded starch include the action of acids, enzymes, dry heat reactions (i.e. dextrins), oxidizing agents and catalysts capable of reducing molecular weight in a controlled and reproducible manner. The starch can be converted in the granular form before dispersion or after being dispersed into water.

The raw and/or carrier starch may also be modified to contain a functional groups such as cationic, anionic, non-ionic or hydrophobic substituent. Methods for modifying starch are well known in the art. See, e.g., U.S. Pat. Nos. 2,661,349, 5,672,699, "Starch: Chemistry and Technology", second edition, edited by R. L. Whistler et al., 1988, pp. 341–343 and "Modified Starches: Properties and Uses", edited by O. Wurzburg, 1986, Chapter 9, pp. 131–147.

The starches of the present invention are used at from about 15 to about 35 percent, preferably from about 20 to about 30 percent by weight based on the foamable composition as a whole. The preferably levels of starch are typically higher for water resistant grades than those which do not require water resistance. The ratio of raw starch to carrier starch will vary depending on properties desired and generally will range from about 3:1 to about 10:1 by weight depending on the nature of the starch and the viscosity desired. The total amount of starch employed including the gelatinized or cooked carrier and the ungelatinized raw starch will typically be in the range of about 10% to about 50% by weight, based on the weight of the composition.

The adhesive composition also includes an alkali. The alkali is preferably an alkali metal hydroxide, such as sodium hydroxide. While a preferred alkali is sodium hydroxide; other bases may be used in partial or full replacement of the sodium hydroxide and include, for example, alkali metal hydroxides such as potassium hydroxide, alkaline earth hydroxides such as calcium hydroxide, alkaline earth oxides such as barium oxides, and alkali metal carbonates such as sodium carbonate, and alkali metal silicates such as sodium silicate. The alkali may be employed in aqueous or solid form. The alkali is used in amounts sufficient to provide the adhesive with a pH greater than 7, more particularly from about 7.5 to 14 and preferably from 10 to 13. Typically this represents an amount of from about 0.3 to about 5% and preferably from about 1 to about 4% by weight based on the weight of starch.

The corrugating adhesive of the invention may also comprise a boron-containing compound, e.g., borax, boric acid, and borate salts, which is useful as a tackifier. The boron-containing compound is an optional ingredient and, when uses, is typically employed in amounts of up to about 5% by weight, based on the total weight of starch.

A surfactant capable of producing a stable foam is present in the foamable corrugating adhesive composition of the present invention. The surfactant must be of a suitable type and structure so as not to change the viscosity or flow properties of the unfoamed adhesive while providing the ability to create a foam with a void value of from about 15% to about 60%, preferably having greater than 25% void volume. Void volume is defined as the weight fraction of adhesive displaced by the air in the foam. For example a void volume of 40% means that 40 grams out of every one hundred grams of adhesive has been replaced with air.

Stability of the foam is important to most machinery and users in that reliable and consistent application of the adhesive onto the substrate is required. As defined in this invention the stability of the foamed adhesive should be at least 6 hours without significant change in void volume. A more preferable stability of between 24 and 48 hours with less than 10% change in void volume would be desired.

Suitable surfactants for use in the practice of the invention are surfactants that do not contain, either within the backbone or within a side chain thereof, propylene oxide or ethylene oxide moieties. Surfactants capable of solubalizing the highly ionic adhesive without forming a gel tend to have little to no overall charge associated with the surfactant (i.e. non-ionic or amphoteric) and are preferred for use in the practice of the invention.

Examples of suitable surfactants for use in the practice of the invention include anionic, cationic, amphoteric, or non-ionic surfactants, or mixtures thereof. Suitable anionic surfactants include, alkyl sulfonates, alkylaryl sulfonates, alkyl sulfates, alkyl and alkylaryl disulfonates, sulfonated fatty acids, sulfates and phosphates of alkylphenols, esters of sulfosuccinic acid and mixtures thereof. Suitable cationic surfactants include, alkyl quaternary ammonium salts, alkyl quaternary phosphonium salts and mixtures thereof. Suitable non-ionic surfactants include alkylphenols, higher fatty acids, higher fatty acid amines, primary or secondary higher alkyl amines, and mixtures thereof. Suitable amphoteric surfactants include disodium lauramino propionate (Monateric1188M available from Uniqema).

For purpose of illustration and clarification, examples of surfactants not suitable for use in the practice of the invention, i.e., surfactants containing propylene oxide or ethylene oxide, include polypropoxyethoxycocamide, fatty acid ethoxylates and deceth-4 phosphate.

The surfactant is used at a level of from 0.05 to 10 percent by weight, and preferably at from 0.2 to 2 percent by weight, based on the total adhesive weight. As some surfactants are provided as solutions, it is to be understood that the percentages recited herein for use are on an "actives" basis.

Any conventional non-chemically functional additives may be incorporated into the adhesive in minor amounts, as desired. Such additives include, for example, preservatives; defoamers; wetting agents; plasticizers; solubilizing agents; rheology modifiers; water conditioners; penetration control agents; peptizers such as urea; gelatinization temperature modifiers; inert fillers such as clay and finely ground polymers; thickeners such as inorganic colloidal clays, guar, hydroxyethyl cellulose, alginates, polyvinyl alcohol, polymers of ethylene oxide and the like; colorants; and emulsions such as polyvinyl acetate. Combinations of such compounds are commercially available and sold as "liquid additives" or "speed enhancers."

Many applications of corrugated board require the resistance to liquid water and humid conditions. When moisture resistance is desired, the corrugating adhesive may include a moisture-resistance agent, which may be present in an amount effective to impart moisture resistance to the adhesive. The moisture-resisting agent may be a ketone-formaldehyde resin or a melamine-formaldehyde resin. One suitable resin is sold under the trademark ULTRA-GUARD by National Starch and Chemical Company, Bridgewater, N.J. Such resin or resins may be added in a total amount ranging from about 1% to about 4% (about 2–3% based on adhesive solids) in the adhesive composition. Other moisture-resistance agents as may be known in the art or as may be found to be suitable for use in connection with the invention further may be employed to impart moisture resistance.

The adhesive is preferably formulated to have a Stein-Hall viscosity of about 25 seconds to about 60 seconds at 100° F. The Stein-Hall viscosity of an adhesive is a quantity that is defined in the art as the length of time for 100 ml of an original volume of about 335 ml of the adhesive at a given temperature to exit a cylindrical vessel via a calibrated orifice having a diameter of approximately 2.73 mm and centrally located in a disc which is approximately 5.8 cm in diameter. The exact Stein-Hall viscosity of the adhesive composition may be adjusted somewhat by varying the relative amounts of starch, alkali, surfactant, liquid carrier and other ingredients in the adhesive composition.

In the preparation of the corrugating adhesives herein, the method used by the skilled practitioner is not critical and generally any suitable method may be employed without serious consequences. Ordinarily, however, the carrier starch is first gelatinized (cooked) in a portion of the water with the alkali (caustic soda) to provide the carrier component of the adhesive. In a separate vessel, a mixture or slurry is made of the raw starch, borax (optional) and remaining water. The carrier and raw starch mixture are combined to form the final adhesive. Optional ingredients, if desired, can be added at any convenient point during the preparation of either component but are usually added to the finished adhesive.

The foamable adhesive composition of the invention is foamed by the addition of energy, by means known in the art such as, but not limited to, by mechanical and/or chemical means. Air or other gases are added to the foamable adhesive composition along with the addition of said energy to produce a stable, consistent foamed adhesive. Preferably air is used to produce the foamed adhesive. The adhesive foam may be produced by mechanical means such as mechanical stirring or agitation, introduction of gases or by chemical means.

A foamable adhesive composition of the invention typically has a Brookfield viscosity, prior to foaming, of from about 300 to 1,500 cps at 100° F. Preferably the viscosity of the foamed adhesive at 100° F. is from 200 to 2,000 cps regardless of the void volume obtained. Other measurements to the quality and runnabilty of the foamed corrugating adhesive can be used and will not change significantly over the un-foamed adhesive. These include, but are not limited to Stein-Hall viscosity, Bostwick flow measurement and thixothropic ratio.

The adhesive composition of the invention may be used in a corrugated product, such as a single-facer or double-facer paper corrugated board. Methods for making corrugated board are known in the art, and conventional methods preferably are employed in conjunction with the present invention. Generally, the method of making corrugated board comprises forming a bond between a corrugated paper "medium" and a liner board on one of both faces of the corrugated medium. The bond is formed by applying adhesive to the corrugating medium, and calendaring the corrugating medium and liner board between a hot roller (typically 360° F.). The method of manufacture of the corrugated board otherwise may be conventional or otherwise as may be found suitable. Most preferably, the corrugated board subsequently is formed into boxes.

Corrugated board, as this term is used herein, encompass all flute sizes, including micro-flutes. Micro-corrugated board is used to make, e.g., small boxes such as fast food containers and gift boxes.

The adhesives described herein can be used to bond single- or double-faced boards using any equipment which is presently employed for the preparation of corrugated board. Thus, the adhesive is usually maintained at a temperature of between 20 and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive.

When using a foamed adhesive, the adhesive may be foamed immediately prior to application, or within 72 hours of being foamed, preferable within 24 hours, most preferable within 6 hours of foaming. Following the application of the adhesive to the fluted paper strip, the latter is then brought into immediate contact with the facing board under the influence of heat and pressure, as is well know in the art. A double-faced board may be subsequently prepared by bringing a second facing in contact with the open fluted surface of the single-faced board by the usual procedures.

The invention can be illustrated by the following non-limiting examples.

EXAMPLES

The following examples demonstrate the invention using different starches, different surfactants, and various surfactant usage levels.

In the following examples, which are merely illustrative of the various embodiments of this invention, all parts and percentages are given by weight and all temperatures are in degrees Celsius unless otherwise noted.

The following test procedures were used to evaluate the various adhesives and starches herein used in preparing corrugated board.

Stein-Hall Viscosity

Viscosities were determined using a conventional Stein-Hall cup and measuring the time in seconds, required for 100 ml of the adhesive composition to pass through an orifice having a diameter of 3/32 inch.

Bostwick Flow

A Bostwick consistometer [Gardner Supply Company] is preheated to 110° F. using hot tap water. The unit is then dried and place level on the benchtop with the bubble in the specified circle. The gate is locked into place using the L-shaped holding bar. The chamber is filled with foamed adhesive at 100° F. Simultaneously the gate is lifted and the timer started recording the intervals in seconds for the adhesive to reach the specified marks (15, 17, 20, 22, 24 cm).

BROOKFIELD VISCOSITY

Viscosities were determined using a Brookfield Viscometer (model RVT) at 20 rpm and 100° F.

Example 1

All samples of corrugating adhesive were prepared in essentially the same manner, differing only in the precise starches employed and the ratios of components. A representative preparation of an unfoamed adhesive, as prepared in a high shear mixer, is presented below.

A carrier component was prepared by cooking at 45° C. (113° F.) 72.0 g of corn starch in 600.5 g of water. A total of 10.8 g of sodium hydroxide (dissolved in 33.4 g of water) was then added and the system was agitated for 5 minutes. The raw starch component was prepared by post-adding 967.4 g of water at about 35° C. (95° F.), 9.6 g borax (pentahydrate), and 520.0 g corn starch to the carrier while under agitation. The prepared adhesive was subsequently used in the different test procedures.

Example 2

100 mls of adhesives from Example 1 was measured by means of a graduated cylinder and weighed to +/−0.1 gram. Approximately 250 mls of adhesive was added to a Waring blender and the appropriate amount and type of surfactant was added and mixed for 1 minute at high speed. 100 mls of the foamed adhesive is carefully poured into a 100 ml tared graduate and weight recorded to 0.1 gram. The effect of the surfactant (type and concentration) on foam volume and quality is shown the Table 1.

TABLE 1

| Surfactant | Surfactant Concentration (%) | Void Volume Maximum | Stability | % Viscosity Change |
|---|---|---|---|---|
| Sodium Lauryl Sulfate | 0.075 | 20.1 | <12 hours | +77 |
| Lauramide | 2.0 | 40.9 | >12 hours | +32 |

TABLE 1-continued

| Surfactant | Surfactant Concentration (%) | Void Volume Maximum | Stability | % Viscosity Change |
|---|---|---|---|---|
| Diethanolamine Nonylphenoxy Poly(ethyleneoxy) ethanol | 0.8 | 45.1 | <4 days | −4.8 |
| Monateric 1188M[1] | 1.6 | 37.6 | >4 days | −36 |
| Monateric 1188M | 3.2 | 61.6 | >4 days | +35 |
| Sodium Carboxyethyl coco phosphoethyl imidazoline | 0.8 | 42.9 | >5 days | +16 |
| Deceth -4 Phosphate | 0.15 | 36.5 | <3 day | +219 |
| Isostearoamphopropionate | 0.4 | 29.1 | >5 days | +19 |
| Capryl hydroxyethyl iminazoline | 0.4 | 36.5 | >4 days | −31 |
| Disodium cocamphodipropionate | 0.3 | 32.6 | >4 days | 12.9 |

[1] = an amphoteric surfactant (disodium lauramino propionate) commercially available from Uniqema This example illustrates the need for specific types of surfactant to produce foamed adhesive with good stability and yet not significantly effecting the viscosity. Surfactants capable of solubalizing the highly ionic adhesive without forming a gel are the preferred materials. These tend to have little to no overall charge associated with the surfactant (i.e. non-ionic or amphoteric).

Example 3

The adhesive formulation was prepared as in Example 1 and foamed with the specified surfactant using the method described in Example 2. The flow properties of the foamed adhesive and the effect of surfactant on flow is shown in Table 2.

TABLE 2

| Surfactant | Surfactant Concentration (%) | Void Volume Maximum | Bostwick Flow (sec) |
|---|---|---|---|
| None | N/A | 8% | 3 |
| Sodium Lauryl Sulfate | 0.075 | 20.1 | 15 |
| Lauramide Diethanolamine | 2.00 | 40.9 | 46 |
| Nonylphenoxy Poly(ethyleneoxy) ethanol | 0.8 | 45.1 | 12 |
| Monateric 1188M | 1.6 | 37.6 | 3 |
| Sodium Carboxyethyl coco phosphoethyl imidazoline | 0.8 | 42.9 | 39 |
| Deceth -4 Phosphate | 0.15 | 36.5 | >120 |
| Isostearoamphopropionate | 0.4 | 29.1 | 18 |
| Capryl hydroxyethyl iminazoline | 0.4 | 36.1 | 5 |
| Disodium cocamphodipropionate | 0.3 | 32.6 | 12 |

The ability of the adhesive to flow is paramount to the application where the adhesive is required to flow though the corrugating machine and provide good runnabilty. Values greater than about 15 are undesirable and generally hinder the overall machine performance.

Example 4

Using the techniques described in the previous examples, the effect of starch type on foam structure and properties was examined. Two common starch types using in the industry, pearl corn and high amylose corn, were formulated as in Example 1 and foamed using the surfactants shown in Table 3.

TABLE 3

| Surfactant | Surfactant Concentration. | Starch Type | Void Volume |
|---|---|---|---|
| Monamid 150-CW[1] | 0.4 | Pearl Corn | 59.7 |
| Monamid 150-CW | 0.4 | High Amylose | 51.9 |
| Monawet MO-70R[2] | 0.4 | Pearl Corn | 47.7 |
| Monawet MO-70R | 0.4 | High Amylose | 42.4 |

[1] = a nonionic surfactant (capriamide DEA (diethyl amine)) commercially available from Uniqema
[2] = an anionic surfactant (dioctyl sulfosuccinate) commercially available from Uniqema This example illustrates the ability to create a high void volume foam with good stability is independent of the starch type and starch composition.

Example 5

The foamed and non-foamed adhesives prepared in Example 4 using the Monamid 150-CW were used to make corrugated board (singleface web). Samples were made across a range of applicator roll gap settings. Bond quality was determined using methods outlined in TAPPI procedures T 400 and T 821 om-87. The strength of the adhesive bonds was such that manual delamination of the finished board resulted in equivalent bond strengths across the adhesive application range tested.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A foamable corrugating adhesive comprising a starch, an alkali, a nonionic or an amphoteric surfactant and a liquid carrier, wherein the surfactant does not contain propylene oxide or ethylene oxide either within the backbone or within a side chain thereof.

2. The adhesive of claim 1 wherein the liquid carrier is water.

3. The adhesive of claim 1 wherein the surfactant is used in an amount sufficient to produce a void volume of from about 15% to about 60%.

4. The adhesive of claim 1 which is a foamed adhesive.

5. The adhesive of claim 4 wherein the foamed adhesive has a void volume of from about 15% to about 60%.

6. The adhesive of claim 1 further comprising a boron-containing compound.

7. The adhesive of claim 1 wherein the boron-containing compound is borax.

8. The adhesive of claim 1 wherein the starch comprises a raw starch and a carrier starch.

9. The adhesive of claim 1 wherein the adhesive further includes a moisture resistance agent.

10. An adhesive of claim 9 wherein the moisture resistance agent is a ketone-formaldehyde resin.

* * * * *